United States Patent
Duno et al.

(10) Patent No.: US 9,587,695 B2
(45) Date of Patent: Mar. 7, 2017

(54) FRICTION MATERIAL FOR APPLYING FRICTION IN LIQUID MEDIUM, AND ASSOCIATED DEVICE AND METHOD

(75) Inventors: Erick Duno, Limoges (FR); Philippe Pantier, Lauriere (FR); Cécile Rommeru, Panazol (FR); Loïc Adamczak, Roussac (FR); Erick Lejamtel, Blond (FR)

(73) Assignee: Valeo Embrayages (FR)

( * ) Notice: Subject to any disclaimer, the term of this patent is extended or adjusted under 35 U.S.C. 154(b) by 969 days.

(21) Appl. No.: 12/935,386

(22) PCT Filed: Mar. 18, 2009

(86) PCT No.: PCT/FR2009/050452
§ 371 (c)(1),
(2), (4) Date: Dec. 3, 2010

(87) PCT Pub. No.: WO2009/122097
PCT Pub. Date: Oct. 8, 2009

(65) Prior Publication Data
US 2011/0070792 A1    Mar. 24, 2011

(30) Foreign Application Priority Data
Apr. 1, 2008   (FR) ...................................... 08 52128

(51) Int. Cl.
*F16D 69/02*   (2006.01)

(52) U.S. Cl.
CPC .... *F16D 69/026* (2013.01); *F16D 2200/0091* (2013.01); *Y10T 442/2008* (2015.04); *Y10T 442/57* (2015.04)

(58) Field of Classification Search
USPC .......................... 442/60, 325; 427/202, 243
See application file for complete search history.

(56) References Cited

U.S. PATENT DOCUMENTS

| 3,738,901 A | 6/1973 | Matsushima et al. |
| 5,646,076 A * | 7/1997 | Bortz ...................... D04H 1/46 188/251 A |
| 6,130,176 A | 10/2000 | Lam |

FOREIGN PATENT DOCUMENTS

| EP | 1 521 010 | 4/2005 |
| GB | 2 100 275 | 12/1982 |
| WO | WO 95/26473 | 10/1995 |
| WO | WO 00/40797 | 7/2000 |
| WO | WO 2007/055951 | * 5/2007 ............... C08K 3/04 |

* cited by examiner

Primary Examiner — Lynda Salvatore
(74) Attorney, Agent, or Firm — Berenato & White, LLC

(57) ABSTRACT

A friction material intended to equip a device for applying friction in a liquid medium, including a fiber mat impregnated with a heat-curable resin. The fiber mat consists of fibers whose length is greater than or equal to 12 mm, and is teased, coated and needled. The friction material features a porosity greater than or equal to 30% by volume and less than or equal to 60% by volume. The friction material includes activated charcoal loads whose specific surface is between 500 m2/g and whose mass content in the friction material is greater than or equal to 5% by weight and less than or equal to 15% by weight.

20 Claims, 4 Drawing Sheets

FRICTION MATERIAL FOR APPLYING FRICTION IN LIQUID MEDIUM, AND ASSOCIATED DEVICE AND METHOD

FIELD OF THE INVENTION

The present invention concerns a friction material intended to equip a device that commissions friction in liquid medium.

The devices concerned are particularly transmission coupling parts, for example to equip a motor vehicle.

In particular, such a friction material is intended to equip an automatic or robotised gearbox, even though its application is not limited to such boxes.

By way of example, such a friction material is likely to constitute a lining of a friction surface of a synchronisation ring, for example of the type of the one divulged in the patent document EP 0 821 175.

BACKGROUND OF THE INVENTION

Friction materials, for friction in liquid medium, have been developed particularly in order to respond to requirements of stability, heat resistance and wear.

The patent document EP O 702 761 divulges a friction material in liquid medium including a mat of fibers impregnated with a heat-hardening type of resin, where the mat of fibers consists of fibers at least 12 mm long, and which are carded, lapped and needled (or needle-punched, or felted, or needle-felted).

The porosity of such a friction material may be between 30% and 60% in volume. This gives a material suited to applications in transmission coupling parts of a motor vehicle for classical conditions of use.

Generally speaking, in the present description overall, when one refers to a range as "included between A and B", the terminals "A" and "B" are generally included in the range.

In a motor vehicle transmission coupling part of classical conditions, the pressures applied on this type of material generally vary between 0.2 and 2 MPa.

The developments of the motor vehicle market are particularly leading designers to improve the efficiency of the drivetrain, for example in order to reduce consumption and/or enhance the comfort of a vehicle.

One of the chosen ways to improve these characteristics consists of automating the transmissions, for example by using automatic transmissions or robotised gearboxes.

Among the numerous criteria for optimising a transmission, one may quote increases of performance, the size of the transmission part, and its cost of manufacture.

Also, a current development trend concerns the possibility of obtaining automated gear changes without pausing.

It has been possible to establish that known friction materials, for friction in liquid medium, for example of the type of the one divulged in the document EP 0 702 761, present properties that make it difficult to jointly optimise the criteria set out above.

It has also been possible to determine that a resistance of the friction material at specific pressures of between at least 0.5 and 10 MPa would be of a nature such as to offer new and promising means of designing transmission parts.

SUMMARY OF THE INVENTION

The aim of the present invention is to offer to the designers of transmission parts an improved friction material in liquid medium, particularly making it possible to increase the range of use under pressure of such a material.

This aim is achieved thanks to a friction material intended to equip a device that commissions a friction iii liquid medium, including a mat of fibers impregnated by a heat-hardening resin, where the mat of fibers consists of fibers at least 12 mm long, and which are carded, lapped and needled and the friction material includes a porosity equal to or in excess of 30% in volume and equal to or below maximum of 60% in volume, where the friction material includes charges of active carbon with specific surface between 500 sq·m·/gr and 2500 sq·m·/gr and with mass content in the friction material equal to or in excess of 5% in weight and equal to or below 15% in weight.

The inventors were able to establish that such a material is likely to be used in a specific pressure range between at least 0.5 and 10 MPa, indeed up to 20 MPa.

Furthermore, this material presents an increased neutrality of its tribological behaviour in accordance with the type of liquid lubricant used.

One also notes a stability of friction in relation to the pressure and speed of shift.

Advantageously, one notes similar tribological behaviour during the phases of shift and maintenance. One also notes excellent stability of elastic behaviour of the said material, as well as its dimensional and tribological characteristics in terms of temperature and energy.

A friction material according to the invention may also hold one or more of the following optional characteristics, which are considered individually or according to all possible combinations:

- the fibres are chosen from among glass fibres, particularly glass E, cotton fibres, polyacrylonitrile (PAN) fibres, pre-oxidised polyacrylonitrile fibres, ceramic fibres, aramid fibres, peat moss fibres, or their combinations;
- heat-hardening resin is chosen from among the phenoplast resins, particularly resol or novolac, aminoplast resins, epoxy resins, polyimide resins, silicone resins, or their combinations;
- the resin is a phenoplast resin of resol type modified by cashew nut shell liquid (CNSL), with mass content between, for example, 10% and 30% in weight of the resin;
- the fibres consist of a mixture of three fibres of different composition, for example glass fibres, particularly glass E, polyacrylonitrile fibres and cotton fibres;
- the volume fraction of each of the fibres of different composition is between 20 and 40% of the mixture of fibres;
- the volume ratio between the resin and the mat of fibre is equal to or in excess of 0.80 and below or equal to 1.20, preferably equal to or in excess of 0.90 and/or below or equal to 1.10;
- the specific surface of the active carbon is equal to or in excess of 800 sq·m·/gr and/or below or equal to 1500 sq·m·/gr;
- the mass content of active carbon is equal to or in excess of 8% in weight and/or below or equal to 12% in weight;
- the average grain size of the active carbon is equal to or in excess of 5 µm and equal to or below 50 µm, preferably equal to or in excess of 8 µm and/or equal to or below 25 µm;
- the active carbon is dispersed in a significantly homogenous way in the volume of the said friction material;
- one side of the said material, intended to form a friction surface, includes between 20% and 70% in volume of active carbon over a thickness between 20 μm and 200 μm, preferably equal to or in excess of 50 μm and/or preferably below 100 μm.

The invention also concerns a friction part, including a friction support over which a friction material is moulded from a casting according to the present invention. Such a friction part is, for example, a synchronisation ring or a coupler.

The invention also relates to a device that commissions a friction in liquid medium including a friction surface coated with the friction material according to the present invention or including a part of the above-mentioned friction.

The device according to the invention may also include one or more of the following optional characteristics, considered individually or according to all possible combinations:
- the device is a transmission coupling part, particularly for a motor vehicle;
- the transmission coupling part allows automated gear changes without opening the drive train;
- the specific pressure on the said friction material, during the functioning of the said device, is between 0.5 and 20 MPa.

The invention also concerns a manufacturing method of a friction material including the following consecutive stages a) to d):
a) supply of a mat of fibers, carded, lapped and needled fibers, with fibers at least 12 mm long;
b) impregnation of the mat in a bath of heat-hardening resin;
c) drying of the excess resin;
d) consolidation under charge of the intermediary material obtained after stage c) at a temperature between 120° C. and 250° C., in order to obtain porosity between 30% and 60% in terms of volume of the final material.
and a stage:
e) introduction of charges of active carbon with specific surface between 500 sq·m·/gr and 2500 sq·m·/gr at a mass content in the friction material equal to or in excess of 5% in weight and equal to or below 15% in weight during stage b) and/or after stage c) and before stage d).

According to one means of completion, stage e) consists of impregnating the mat in a bath including a mixture of resin and active carbon.

According to one means of completion which may be combined with the previous one, stage e) consists of pulverising a waterborne solution including resin, for example the resin of stage b, and active carbon, then making the water evaporate, for example with the aid of infra-red heating.

The present invention is now illustrated by non-limiting examples.

Comparative examples make it possible to enhance the advantages of a friction material according to the invention.

All the materials considered, examples according to the invention and comparative examples, were completed from the same basic formulation of the mat of fibres impregnated by heat-hardening resin, the basic components of which are set out in table I:

TABLE I

| Basic components | % mass content |
|---|---|
| Fibres of the mat | |
| glass fibres E | 30.8 |
| PAN fibres | 14.8 |
| cotton fibres | 14.8 |

TABLE I-continued

| Basic components | % mass content |
|---|---|
| Heat-hardening resin | |
| modified resol type phenol CNSL | 38.6 |
| Calcium stearate and others | ≤1 |

The heat-hardening resin used is a phenol liquid resin of resol type.

The following have been added to the basic components of table I:
- active carbon with average grain size between 8 and 15 μm and specific surface (BET) of 1100 sq·m·/gr in order to obtain examples according to the invention;
- no charge or other charges, for example amorphous silica, or calcium silicate, in order to obtain comparative examples.

Samples according to the invention have been manufactured by the addition of approximately 10% in weight of the active carbon mentioned above, with different porosities, particularly with porosity volumes of 50%, 40%, 30%.

All of the materials thus obtained present remarkable properties.

One notes that the porosity of the said material allows very fast drying of the oil film which is established within a transmission coupling part in liquid medium and makes it possible to establish a friction regime significantly constant over a broad range of operating pressure.

The examples detailed below and set out in table II were obtained on the basis of the components of table I with a porosity of 50% in volume. Examples EX1 and EX2 are examples according to the invention with 10% in weight (that is, about 3.6% in volume of the final material) of active carbon. Examples EX-C1, EX-C2 and EX-C3 are comparative examples including charges of amorphous silica and calcium silicate without charge, respectively.

The active carbon used presents a specific surface in the order of 1500 sq·m·/gr and an iodine value (ASTM D4607) in the order of 100 mg/gr.

The amorphous silica used is marketed by the company DEGUSSA.

The calcium silicate used corresponds to the commercial reference SICACELL of the company ITAPROCHIM.

TABLE II

| | Type of charge | Division of charges |
|---|---|---|
| EX1 | Active carbon | In surface |
| EX2 | Active carbon | In volume |
| EX-C1 | Amorphous silica | In surface |
| EX-C2 | Calcium silicate | In surface |
| EX-C3 | No charge | — |

The materials EX1, EX-C1, EX-C2 were obtained by pulverisation of a waterborne solution, including heat-hardening resin and charges on the mat of fibres impregnated before consolidation under charge.

The material EX2 was obtained by impregnation of the mat of fibres in a bath including a mixture of heat-hardening resin and active carbon so that the impregnation makes it possible to spread the active carbon in volume in the mat of fibres.

All of the materials exemplified with obtained by consolidation under charge of the mat of fibres previously impregnated, having possibly been the object of a pulverisation of charges at a temperature of 200° C., and wedges were arranged in order to make it possible to obtain a porosity of 50% in the final material.

DETAILED DESCRIPTION

FIGS. 1 to 4 attached hereto represent the variation of different parameters measured with examples of material according to the invention and comparative examples.

Figure 1:
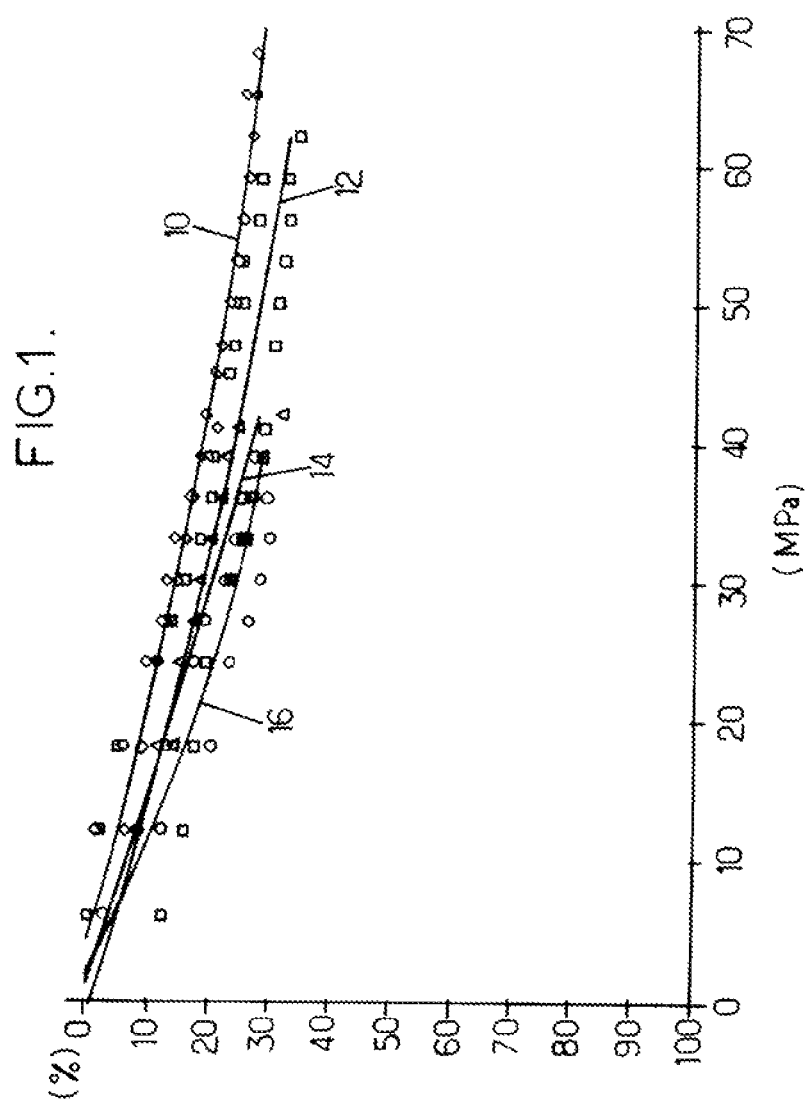
FIG. 1 shows the evolution of the reduction of thickness of a material in accordance with the specific pressure applied.

FIG. 1 shows the evolution of the reduction of thickness of a material (expressed as a %, in y-coordinate) in accordance with the specific pressure applied (expressed in MPa, in x-coordinate). Curves 10 (corresponding to the diamonds) and 12 (corresponding to the squares) were obtained by measuring the variation of thickness of samples of material according to the invention EX1 at temperatures of 80° C. and 120° C. in oil, respectively.

Curves 14 (corresponding to the triangles) and 16 (corresponding to the circles) were obtained by measuring the variation of thickness of samples of material of comparative example EX-C1 at temperatures of 80° C. and 120° C. in oil, respectively.

The measurement is made by applying a given pressure to the example to be measured, arranged between two parallel trays in a vat including oil, with cycles where the pressure is applied for 10 seconds and then released for 10 seconds. One applies 1000 cycles of this type, and then measures the variation of thickness between the initial sample and the sample after these 1000 cycles. The samples tested are rings of the materials in question, with exterior diameter of 50 mm and thickness 1 mm.

One important characteristic of the material corresponds to the specific pressure at which a reduction of thickness of 25% is obtained. From the curves represented in FIG. 1, one deduces the following results, presented in table III.

TABLE III

|  | T (° C.) | Specific pressure with reduction of thickness 25% |
|---|---|---|
| EX1 | 80° C. | 60 MPa |
|  | 120° C. | 43 MPa |
| EX-C1 | 80° C. | 36 MPa |
|  | 120° C. | 30 MPa |

One notes that the behaviour of the material according to the invention is particularly advantageous, and that for example, it supports a specific pressure significantly double at 80° C. in comparison with a material where, instead of the charges of active carbon according to the invention, charges of amorphous silica have been introduced.

Figure 2:
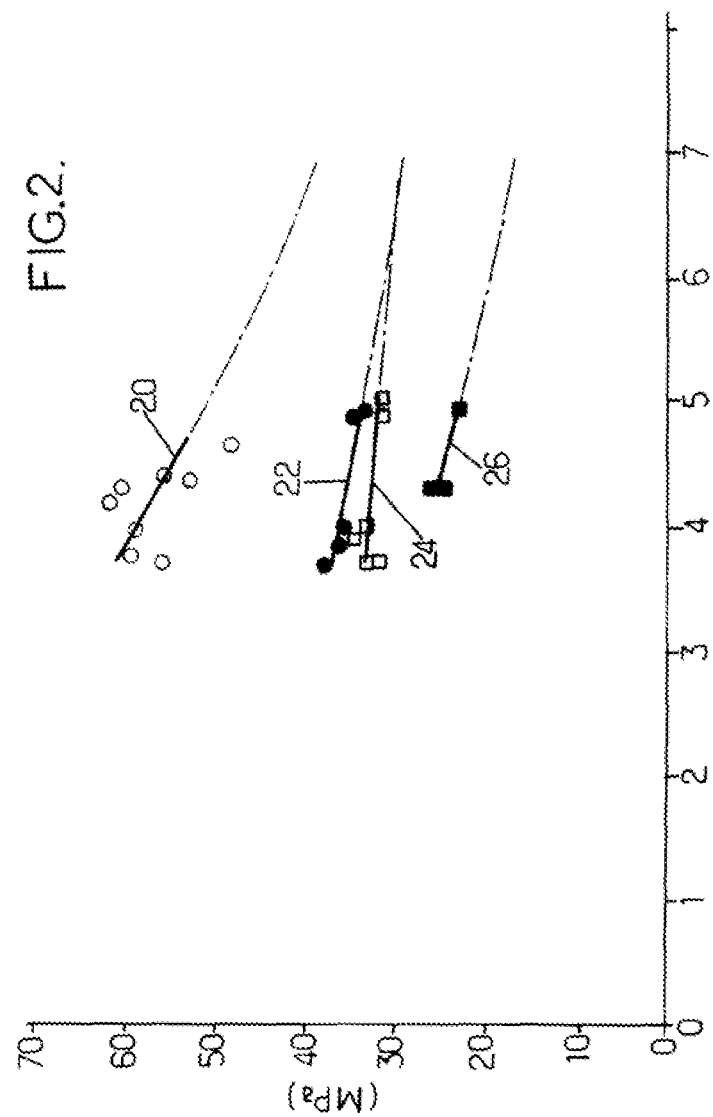
FIG. 2 shows measured results of fatigue strength of materials.

FIG. 2 shows measured results of fatigue strength of the same materials as the previous ones, and in a similar experimental environment.

For this test, one first of all determines a specific test pressure below 5 MPa at the specific pressure at which a reduction of thickness of 25% was measured according to the previous test. One then determines the number of cycles at the end of which a new sample loses 25% of its initial thickness, for a given temperature. FIG. 2 shows the measured points arranged in accordance with the specific pressure applied (expressed in MPa, in y-coordinate) and the number of cycles determined (expressed in decimal logarithm, in x-coordinate).

Curves 20 and 22 (corresponding to the circles, empty and full respectively) were obtained for samples of materials according to the invention EX1 at temperatures of 80° C. and 120° C. respectively. The curves 24 and 26 (corresponding to the squares, empty and full respectively) were obtained for samples of materials of comparative example EX-C1 at temperatures of 80° C. and 120° C. respectively.

One may also determine that the fatigue resistance of a sample according to the invention is considerably improved in comparison to a sample where, instead of the charges of active carbon according to the invention, charges of amorphous silica have been introduced.

For example, if one considers a point of functioning at 20 MPa, one shows that a material according to EX-C1 may operate for approximately one million cycles at 120° C. before losing 25% of its initial thickness, while a material according to the invention, EX1, may operate in the same conditions for more than one hundred million cycles.

Dynamic friction tests have also been undertaken in order to characterise the materials.

According to a first test technique, one evaluates the evolution of the friction coefficient of a disk over time at a pressure equivalent to that at which a synchronisation ring would be likely to operate. A disk of the material to be studied with external diameter of 130 mm, and internal diameter of 100 mm, 0.8 mm thick, is arranged on a counter-material in steel XC48, in oil at a temperature of 100° C. The test takes place on a dynamometer and develops according to several phases detailed in table IV below.

TABLE IV

| Level | Specific energy | Number of cycles | Inertia ($m^2 \times kg$) | Speed (rpm) | Specific pressure | Cycle time | Measurement |
|---|---|---|---|---|---|---|---|
| Running in | 50 J/cm$^2$ | 500 | 0.49 | 1420 | 1 MPa | 10 s | Yes |
| Level 1 | 50 J/cm$^2$ | 100 | 0.49 | 1420 | 1 MPa | 15 s | Yes |
| Level 2 | " | 4800 | " | " | 3 MPa | " |  |
| Level 3 | " | 100 | " | " | 1 MPa | " |  |

The friction coefficient and wear are measured. One determines the dynamic friction coefficient $\mu_d$ which makes it possible to express the capacity to develop a friction torque when the gear change speed is not zero. It is measured at different specific pressures.

One also determines the final friction coefficient $\mu_f$ which makes it possible to express the capacity to develop a friction torque when the gear change speed is almost zero.

One also determines the ratio between $\mu_{d\ initial}$ at 1 MPa and $\mu_f$ at 1 MPa which makes it possible to quantify the stability of friction over a range of operating pressure.

The tests were carried out with samples of material according to the invention EX1 and samples of comparative material EX-C2. The results are set out in table V below:

TABLE V

|  | EX1 | EX-C2 |
|---|---|---|
| $\mu_d$ at 1 MPa | 0.108 | 0.121 |
| $\mu_d$ at 3 MPa | 0.105 | 0.108 |
| $\mu_d$ at −1 MPa | 0.111 | 0.102 |
| Ratio $\mu_{d\ initial}/\mu_f$ at 1 MPa | 1.03 | 0.85 |
| $\mu_f/\mu_d$ at 1 MPa | 0.97 | 1.04 |
| $\mu_f/\mu_d$ at 3 MPa | 0.98 | 1.09 |
| $\mu_f/\mu_d$ at −1 MPa | 1.01 | 1.17 |

One notes that advantageously, the dynamic friction coefficient $\mu_d$ of a material according to the invention, EX1, is more stable according to the constraint applied than a comparative material EX-C2.

Particularly advantageously, the ratio corresponding to the ratio $\mu_{d\ initial}$ on $\mu_f$ is close to 1 for a material according to the invention, EX1, while it is 15% lower for a comparative material EX-C2.

One also notes that the ratio $\mu_f/\mu_d$ at the different constraints applied is stable and close to 1 for a material according to the invention EX1, while it varies by about 15% for a comparative material EX-C2.

This gives a possibility to guarantee greatly improved performances in use.

Another technique of tribological tests has also been commissioned, known as "increasing energy".

According to this technique, one studies the tribological behaviour of a material subjected to the stages below, set out in table VI.

TABLE VI

| Level | Specific energy | Number of cycles | Inertia (m² × kg) | Speed (rpm) | Specific pressure | Cycle time | Measurement |
|---|---|---|---|---|---|---|---|
| Running in | 50 J/cm² | 500 | 0.49 | 136.6 × √Sd | 1 MPa | 10 s | Yes |
| Level 1 | 50 J/cm² | 500 | 0.49 | 136.6 × √Sd | 1 MPa | 10 s | Yes |
| Level 2 | 100 J/cm² | 500 | 0.49 | 192.9 × √Sd | 1 MPa | 12 s |  |
| Level 3 | 200 J/cm² | 500 | 0.49 | 272.8 × √Sd | 1 MPa | 20 s |  |
| Level 4 | 300 J/cm² | 500 | 0.49 | 334.2 × √Sd | 1 MPa | 24 s |  |
| Level 5 | 400 J/cm² | 500 | 0.49 | 385.8 × √Sd | 1 MPa | 28 s |  |
| Level 6 | 600 J/cm² | 500 | 0.49 | 472.6 × √Sd | 1 MPa | 43 s | Yes |

With Sd = 2 × S, and S being the surface of the lining in cm².

The test is always carried out with rings of material arranged on a counter-material in steel XC48 in oil at 100° C.

One also measures $\mu_d/\mu_f$, the ratio $\mu_f/\mu_d$ as well as a ratio $\mu_{d\ 50\ J/cm^2}$ on $\mu_{d\ 200\ J/cm^2}$ which makes it possible to quantify the stability of friction on a range of dissipated energy between 50 J/cm² and 200 J/cm².

Figure 3:
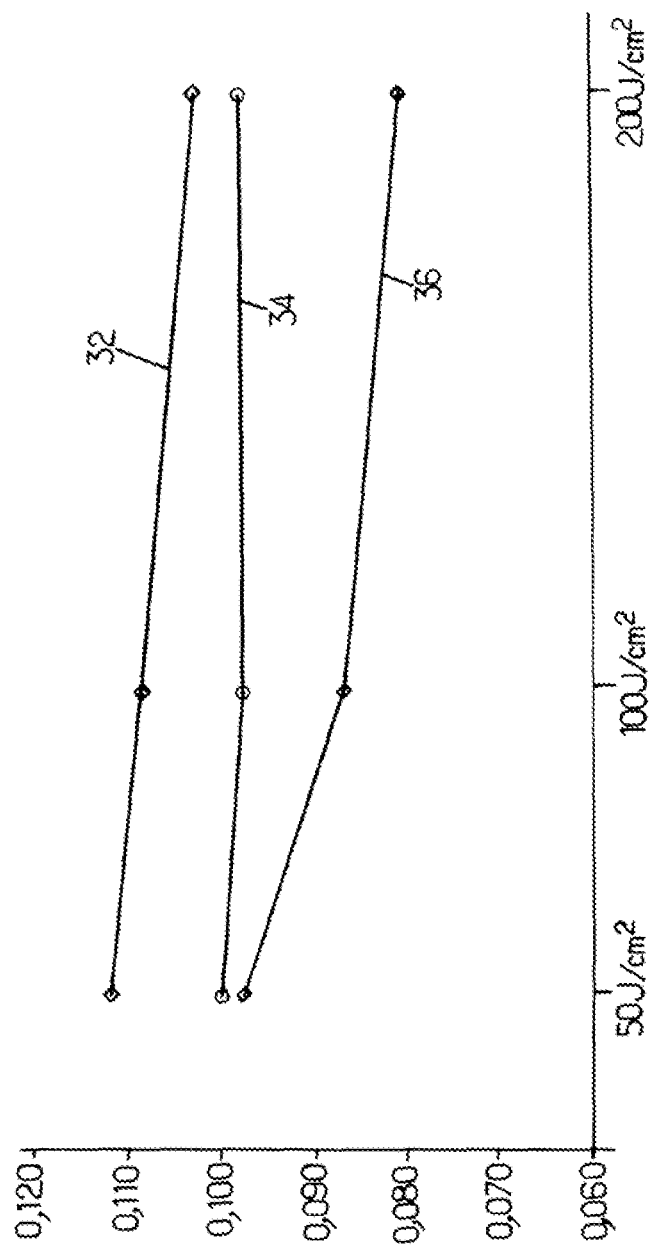
FIG. 3 shows the dynamic values of friction $\mu_d$ in accordance with the dissipated energy.
Figure 4:
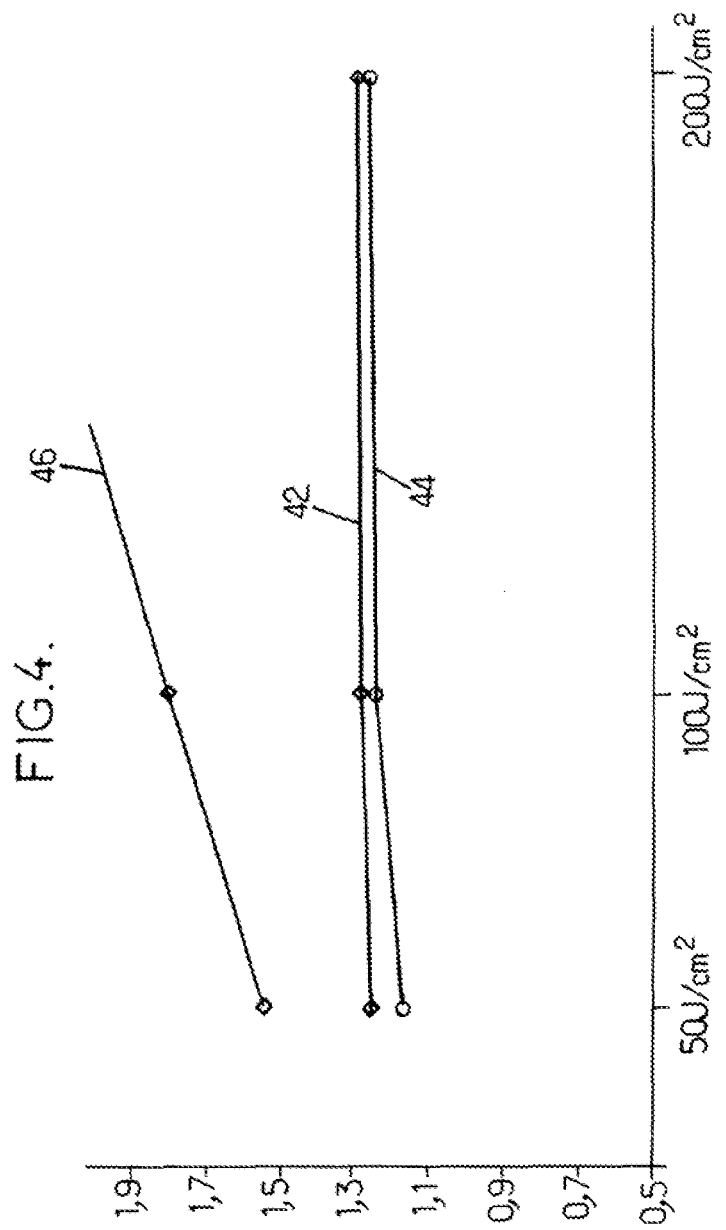
FIG. 4 shows the ratio $\mu_s/\mu_d$ in accordance with the dissipated energy.

FIGS. 3 and 4 show respectively the dynamic values of friction $\mu_d$, and of the ratio $\mu_f/\mu_d$ (in y-coordinate) in accordance with the dissipated energy (in x-coordinate).

The tests were carried out with two materials according to the invention, EX1 and EX2, and a comparative material EX-C3, and the results were shown with the respective references 34, 32 and 36 in FIGS. 3 and 44, 42 and 46 in FIG. 4.

One notes in FIG. 3 that the dynamic friction coefficient, $\mu_d$, is extremely stable in accordance with the dissipated energy when the charges of active carbon are arranged on the surface (EX1, 34) and stable when charges of active carbon are arranged in the volume (EX2, 32) in comparison with the results obtained with a material without charge (EX-C3, 36).

Furthermore, it is advantageous that the dynamic friction coefficient is the highest possible, which make it possible, for example, to use motor units of reduced capacity.

One notes that the dynamic friction coefficient at 200 J/cm² of the materials according to the invention, EX1 and EX2, is in the order of 0.1, while it is approximately 20% lower for the material without charges EX-C3.

FIG. 4 shows that the ratio $\mu_f/\mu_d$ is remarkably stable between 1.1 and 1.3 for the materials according to the invention (EX1, 44; EX2, 42) while one notes a very significant variation of this ratio for the comparative material (EX-C3, 46).

The ratio $\mu_{d\ 200\ J/cm^2}$ on $\mu_{d\ 50\ J/cm^2}$ was calculated for the materials mentioned, as stated in table VII below:

TABLE VII

|  | $\mu_{d\ 200\ J/cm^2}/\mu_{d\ 50\ J/cm^2}$ |
|---|---|
| EX1 | 0.98 |
| EX2 | 0.92 |
| EX-C3 | 0.83 |

These values also illustrate the remarkable stability of the material according to the invention, EX1, EX2 compared to a comparative example EX-C3, where the material is without charges.

One material according to the invention therefore makes it possible to very advantageously guarantee a torque capacity which is significantly constant according to the level of dissipated energy.

It is therefore possible to considerably simplify the laws of operation of gear box calculators, because whatever the difference of speed to be equalized (corresponding to a dissipated energy), the order of stress given to a motor unit may be linear according to the engine torque to be transmitted.

Generally speaking, the material according to the invention may be formed according to the usual techniques. It may particularly be moulded from a casting on a friction support. The friction support surfaces may be varied, particularly flat, frustoconical, cylindrical, continuous or discontinuous.

It is also possible to create groves in the friction material according to the invention for the operation of moulding from a casting.

By way of example, the material according to the invention is produced in the form of strips in which narrow bands may be cut, which are arranged on a friction support before the moulding stage.

The material according to the invention is particularly well suited for commissioning in automatic or robotised transmission coupling parts, particularly those that operate without opening the drivetrain.

The invention is not limited to the examples of completion, and must be interpreted without limitation, including all means of equivalent completion.

The invention claimed is:

1. A friction material for friction in liquid medium, the friction material including:
    a mat of fibers impregnated by a heat-hardening resin;
    fibers of the mat being carded, lapped and needled during the formation of the mat;
    the carded, lapped and needled fibers being equal to or in excess of 12 mm in length; and
    charges of active carbon with specific surface between 500 sq·m·/gr and 2500 sq·m·/gr and with mass content in the friction material equal to or in excess of 5% in weight and equal to or below 15% in weight;
    the friction material having porosity equal to or in excess of 30% in volume and equal to or below 60% in volume, wherein
    one side of the friction material, intended to form a friction surface, comprises between 20 and 70% in volume of active carbon over a thickness between 20 μm and 200 μm.

2. The friction material according to claim 1, wherein the fibers are selected from the group consisting of glass fibers, cotton fibers, polyacrylonitrile (PAN) fibers, pre-oxidised polyacrylonitrile fibers, ceramic fibers, aramid fibers, peat moss fibers, and their combinations.

3. The friction material according to claim 1, wherein the heat-hardening resin is selected from the group consisting of phenoplast resins, particularly resol or novolac, aminoplast resins, epoxy resins, polyimide resins, silicone resins, and their combinations.

4. The friction material according to claim 3, wherein the resin is a phenoplast resin of resol type modified by cashew nut shell liquid (CNSL), with mass content between 10% and 30% in weight of resin.

5. The friction material according to claim 1, wherein the fibers consist of a mixture of three fibers of different composition.

6. The friction material according claim 5, wherein the volume fraction of each of the fibers of different composition is between 20 and 40% of the mixture of fibers.

7. The friction material according to claim 1, wherein the volume ratio between the resin and the mat of fibers is equal to or in excess of 0.80 and equal to or below 1.20.

8. The friction material according to claim 1, wherein the specific surface of active carbon is equal to or in excess of 800 sq·m·/gr and equal to or below 1500 sq·m·/gr.

9. The friction material according to claim 1, wherein the mass content of active carbon is equal to or in excess of 8% in weight and/or equal to or below 12% in weight.

10. The friction material according to claim 1, wherein the average grain size of the active carbon is equal to or in excess of 5 μm and equal to or below 50 μm.

11. A friction part, including a friction material for friction in liquid medium and a friction support upon which the friction material is moulded with a casting;
    the friction material including:
    a mat of fibers impregnated by a heat-hardening resin;
    fibers of the mat being carded, lapped and needled during the formation of the mat;
    the carded, lapped and needled fibers being equal to or in excess of 12 mm in length; and
    charges of active carbon with specific surface between 500 sq·m·/gr and 2500 sq·m·/gr and with mass content in the friction material equal to or in excess of 5% in weight and equal to or below 15% in weight;
    the friction material having porosity equal to or in excess of 30% in volume and equal to or below 60% in volume, wherein
    one side of the friction material, intended to form a friction surface, comprising between 20 and 70% in volume of active carbon over a thickness between 20 μm and 200 μm.

12. A device providing a friction in liquid medium, the device including a friction surface coated with a friction material including:
    a mat of fibers impregnated by a heat-hardening resin;
    fibers of the mat being carded, lapped and needled during the formation of the mat;
    the carded, lapped and needled fibers being equal to or in excess of 12 mm in length; and
    charges of active carbon with specific surface between 500 sq·m·/gr and 2500 sq·m·/gr and with mass content in the friction material equal to or in excess of 5% in weight and equal to or below 15% in weight;
    the friction material having porosity equal to or in excess of 30% in volume and equal to or below 60% in volume, wherein
    one side of the friction material, intended to form a friction surface, comprises between 20 and 70% in volume of active carbon over a thickness between 20 μm and 200 μm.

13. The device according to claim 12, wherein the device is a transmission coupling part for motor vehicles.

14. A manufacturing procedure of a friction material, as recited in claim 1, including the following consecutive stages a) to d):
    a) supplying a mat of fibres carded, glazed and felted, the length of the fibres of which is equal to or in excess of 12 mm;
    b) impregnating the mat in a heat-hardening resin bath;
    c) drying the excess resin;
    d) consolidating under charge the intermediary material obtained after stage c) at a temperature between 120° C. and 250° C. in order to obtain a porosity between 30% and 60% in volume of the final material; and a stage:
    e) introducing charges of active carbon with specific surface between 500 sq·m·/gr and 2500 sq·m·/gr at a mass content in the friction material equal to or in excess of 5% in weight and equal to or below 15% in weight during stage b) and/or after stage c) and before stage d).

15. A manufacturing procedure of a friction material according claim 14, wherein stage e) consists of impregnating the mat in a bath including a mixture of resin and active carbon.

16. A procedure according to claim 14, wherein stage e) consists of pulverising a waterborne solution including resin, for example the resin of stage b, and active carbon, then making the water evaporate, for example with the aid of infra-red heating.

17. The friction material according to claim 5, wherein the three fibers are glass fibers, polyacrylonitrile fibers and cotton fibers.

18. The friction material according to claim 5, wherein a volume fraction of each of the fibers of different composition is between 20 and 40% of the mixture of the fibers.

19. The friction material according to claim 7, wherein the volume ratio between the resin and the mat of fibers is equal to or in excess of 0.90 and/or equal to or below 1.10.

20. A friction material for friction in liquid medium, the friction material including:

- a mat comprising fibers being carded, lapped and needled during the formation of the mat; and
- charges of active carbon with specific surface between 500 sq·m·/gr and 2500 sq·m·/gr and with mass content in the friction material equal to or in excess of 5% in weight and equal to or below 15% in weight;
- the mat of the fibers being impregnated by a heat-hardening resin;
- the carded, lapped and needled fibers being equal to or in excess of 12 mm in length;
- the friction material having porosity equal to or in excess of 30% in volume and equal to or below 60% in volume, wherein
- one side of the friction material, intended to form a friction surface, comprises between 20 and 70% in volume of active carbon over a thickness between 20 μm and 200 μm.

* * * * *